Nov. 10, 1970     H. BIDWELL     3,539,315
METHOD OF MAKING A VITRIFIED GRANULAR ABRASIVE ELEMENT
Filed July 21, 1967     3 Sheets-Sheet 1
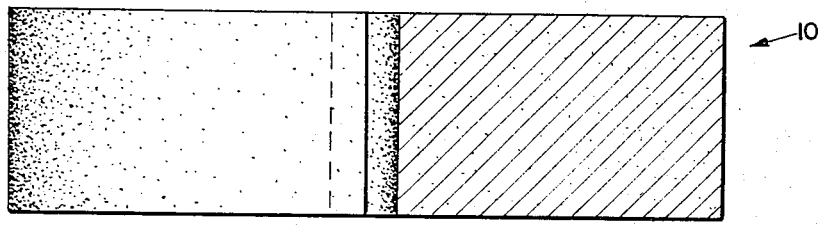
FIG. 1.
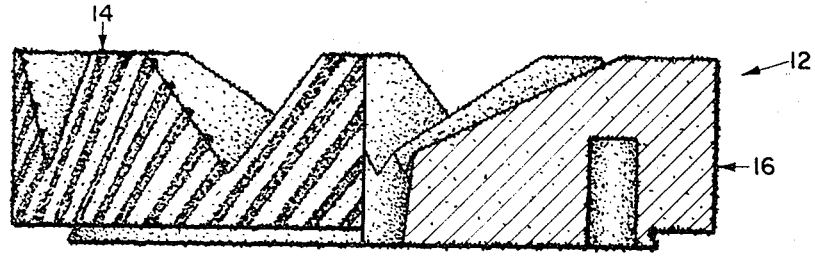
FIG. 2.
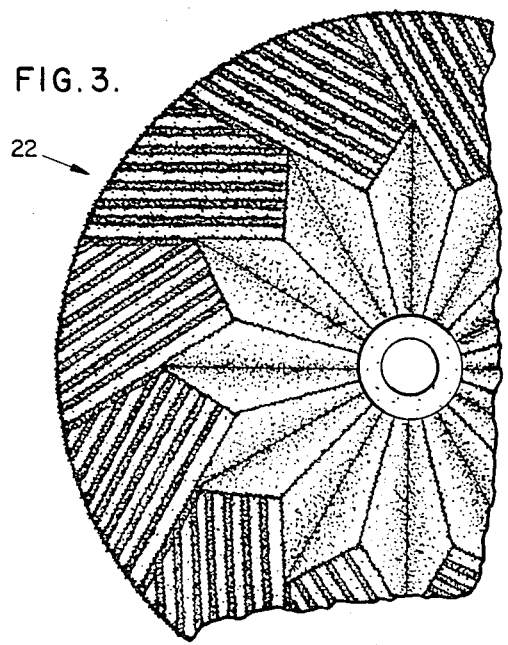
FIG. 3.
FIG. 4.
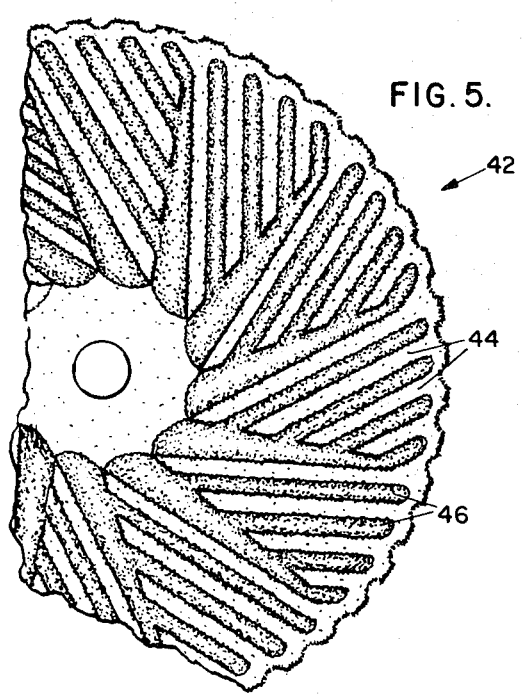
FIG. 5.
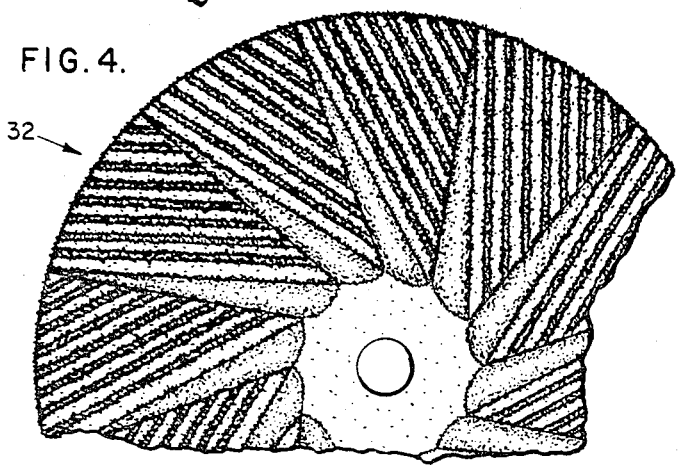
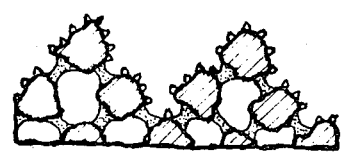
FIG. 18.
INVENTOR.
HOWARD BIDWELL
BY Kenwood Ross
ATTORNEY.

Nov. 10, 1970  H. BIDWELL  3,539,315
METHOD OF MAKING A VITRIFIED GRANULAR ABRASIVE ELEMENT
Filed July 21, 1967  3 Sheets-Sheet 2

INVENTOR.
HOWARD BIDWELL
BY Kenwood Ross
ATTORNEY.

Nov. 10, 1970        H. BIDWELL        3,539,315
METHOD OF MAKING A VITRIFIED GRANULAR ABRASIVE ELEMENT
Filed July 21, 1967        3 Sheets-Sheet 3
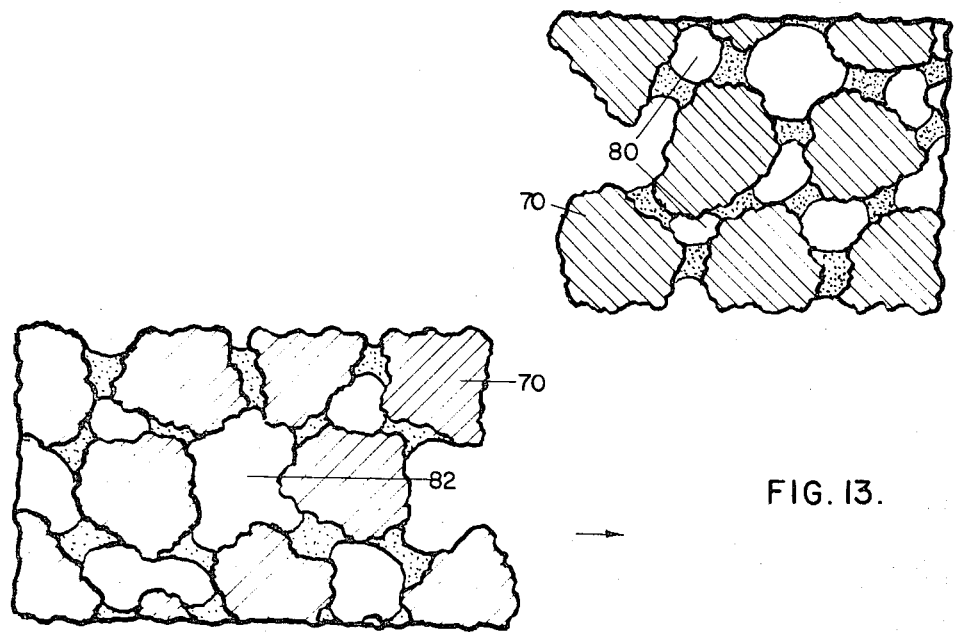
FIG. 13.
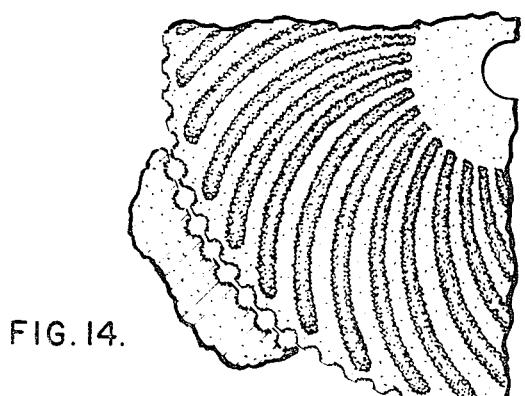
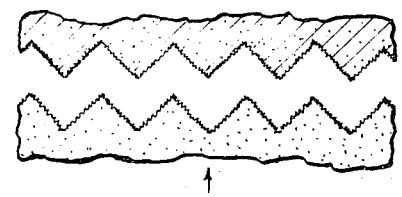
FIG. 16.
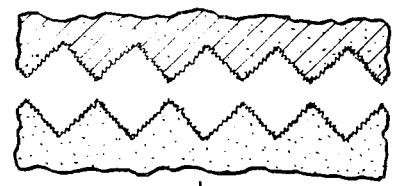
FIG. 17.
FIG. 14.
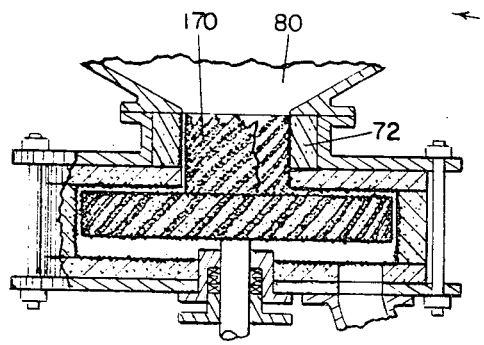
FIG. 15.
INVENTOR.
HOWARD BIDWELL
BY Kenwood Ross
ATTORNEY.

United States Patent Office 3,539,315
Patented Nov. 10, 1970

3,539,315
METHOD OF MAKING A VITRIFIED GRANULAR ABRASIVE ELEMENT
Howard Bidwell, 56 Aldrich St.,
Granby, Mass. 01033
Continuation-in-part of application Ser. No. 315,589, Oct. 11, 1963. This application July 21, 1967, Ser. No. 655,190
Int. Cl. B24d 5/02, 5/10
U.S. Cl. 51—293                                   1 Claim

ABSTRACT OF THE DISCLOSURE

Methods of modifying the surface characteristics of usual normal vitrifiable ceramic-type granular composed grinding wheel moulded blanks into cooperantly matched rotor-stator component element shapes and forms, suitable for use in the processing of fibrous materials, by sculpturally configuring the working surfaces thereof while in the unfired condition, with fiber flow influencing contours and fiber abrading grooving combinations to a maximized rough surface texture and subsequently fine grit-coating the exposed surface granules thereof, followed by the permanent fusing of the grit-coating thereto during the kiln-firing of the so-configured and so-coated elements, by which said elements, when suitably mounted and applied, cause the amplification of induced ingress fluid flows created by virtue of the porosity of the structure and the rotation of the rotating member during normal operation, as to improve, enhance and accelerate the processing of fibrous materials, particularly those types generally employed in paper making and allied purposes.

CROSS REFERENCES TO RELATED APPLICATIONS

The application is a continuation-in-part of copending application Ser. No. 315,589, filed Oct. 11, 1963 and now U.S. Pat. No. 3,387,794.

SUMMARY OF THE INVENION

The methods teach the sculpturally-developing and grit-coating of vitrifiable ceramic-type granular-composed moulded grinding wheel blanks, while in the green-unfired condition and preparatory to the kiln-firing thereof, into opposed and cooperant sculpturally-matched rotor and stator fibrous material processing elements. The sculpturally-developing includes the profiling of the working surfaces and the configuring of the profiled working surfaces of cooperant companion parts, such rotor and stator assemblies, or other arrangements.

The fiber-treating capacities of the processing elements are enhanced by the roughness of the surfaces, the pre-sculptured match configurations, and the fused applied fine grit thereon.

The elements incorporate abnormally rough surface textures offering porosity properties which enhance the fiber treating capacities thereof.

The elements are characterized by superior fiber moisture conditioning, fiber separation, fiber abrading, and fiber scoring properties by virtue of the sculpturing, same initiating, accelerating and amplifying induced internal fluid flows leading to improved fiber processing in any phase of fibrous material stock preparation.

The sculpturing creates a maximized exposure of structure voids at the interstices between the surface granules so as more readily to promote ingress fluid flows of localized areas of maximized fiber impact of the configured portions of the porous component. That is, the sculpturing causes maximum concentrated induced ingress fluid flows at localized areas or portions of the working surfaces for maximum fiber impact, initiated by a rotor component rotative with respect to a stator component.

The sculpturing is a prime requisite in the proper development of components for obtaining the most effective reaction hygroscopically, and the induced ingress fluid flows constitute one of the most essential factors contributing to the acceleration of the hygroscopic reaction of organic fibrous materials to an accepted stock condition.

The stationary and rotating components, sculptured with matching flow influencing configurations, provide means for deterring and retarding fibers so as to expose same to prolonged periods of fiber abrasion, particularly at the critical or leading portions of the configurations, by virtue of ingress fluid flows induced by the rotating member and the porosity of the opposed components.

An additional contributing factor to the acceleration of fiber cellulose-water reaction is in the sparse layer of applied fine size grit, fused to the exposed surface granules at the working surface areas during the kiln-firing.

BACKGROUND OF THE INVENTION

(1) Field of the invention

The modification of common types of vitrifiable grinding wheel composition moulded blanks, into fibrous material processing matched cooperantly opposed companion rotor-stator component element parts, while in the green unfired state, by the removal of exterior granules whereby the work surfaces are contoured and grooved otherwise roughened to a maximized degree of surface texture, preparatory to the kiln-firing thereof by normal grinding wheel procedures, whereby the so-sculpturally modified and kiln-fired matched element articles, when suitably mounted and applied to predetermined types and kinds or phases of fibrous material processing are particularly adapted to fiber moisture conditioning and processing of bulk materials to a slurried condition of individualized fibers and the refining thereof, such refining being enhanced processwise by virtue of the induced fluid ingress flows created by the character of the pre-sculptured modification and the porous structure and the resultant forces initiated by the rotating member during normal fiber processing operation whereby the cellulose-water reaction of organic type fibers are hygroscopically accelerated and inorganic fibers are more effectively processed. Fusing a fine grit coating to the working surface granules as herein exemplified further enhances the processing effectiveness of said components.

(2) Description of the prior art

Gardner et al., No. 945,931 of January 1910 discloses a grinding disk having a contoured surface of projected sharp abrasive granules bonded to a backing with glue.

Schellens, No. 2,042,635 of June 1936 discloses a porous abrading wheel consisting essentially of sharp and irregular metallic or metal carbide abrasive particles bonded in metal.

Garrison, No. 2,584,862 of February 1952 discloses a porous grinding wheel consisting of sharp, irregular, randomly oriented abrasive grains bonded by a metal matrix.

Houchins, No. 2,730,439 of January 1956 discloses a porous vitrified-bonded abrasive wheel having sharp abrasive wheel having sharp abrasive grains protruding from the surface.

BRIEF DESCRIPTION OF THE DRAWINGS

FIG. 1 is a view, in side elevation, with a half portion in section, of an unfired green granular-composed compact grinding wheel blank, the basic commodity from which the fibrous material processing components of the invention are sculpturally developed;

FIG. 2 is a view, in side elevation, with a half portion in section, showing one type of rotor, as sculptured from a FIG. 1 type of blank;

FIG. 3 is a small scale fragmentary view, in top plan, of another type of rotor, sculptured from a FIG. 1 type of blank;

FIG. 4 is a similar scale fragmentary view, in top plan, of another type of rotor sculptured from a FIG. 1 type of blank;

FIG. 5 is another small scale fragmentary view, in top plan, showing a rotor embodying a modified form of surface configuration from that shown in FIG. 4;

FIG. 13 is a greatly enlarged fragmentary view in cross section of FIG. 12, at a momentary alternating opposed position of the leading fiber-score-drawing duct ridges at position "A" of FIG. 11;

FIG. 14 is a fragmentary view, in top plan, of a modified form of the FIG. 5 rotor showing a volute type of sculptured channelling and a portion of the stator opposing the perimeter of a companion rotor;

FIG. 15 is a fragmentary view, in cross section, of one type of apparatus ot which components of the type shown in FIGS. 5 and 10 to 14 and matched companion stators may be adapted;

FIG. 16 is a view, in top plan, similar to FIG. 12, of fragmentary portions of opposed sculptured channel edges with a saw-toothed formation;

FIG. 17 is a view similar to that of FIG. 16 showing the saw-tooth configuration sculpturally oriented on the lead edges of the channel; and FIG. 18 is a small scale fragmentary view, similar to that of FIG. 9, but showing the surface character of component working surface sparsely coated with fine grit preparatory to fusing during kiln-firing.

DESCRIPTION OF THE PREFERRED EMBODIMENT

Figure 6:
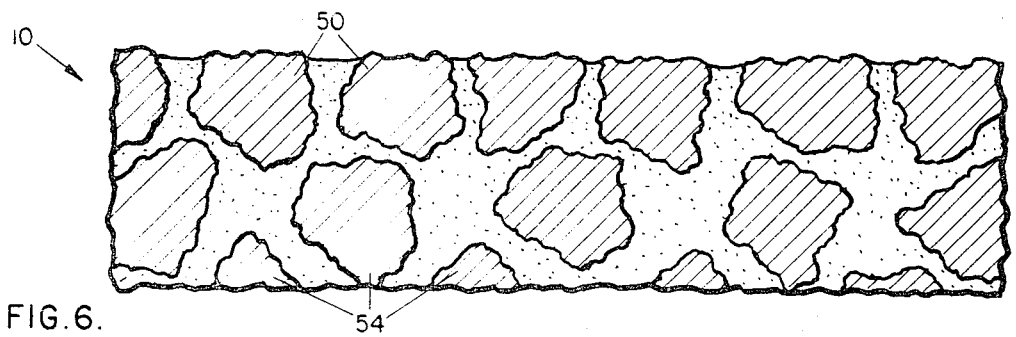
FIG. 6 is a greatly-enlarged fragmentary view, in cross section, showing, in a generally schematic manner, the granule arrangement at the surface of the FIG. 1 type of blank as same is removed from a mould.

As the basic commodity, I use regular unfired green oven-dried granular-composed moulded compact grinding wheel blanks of compositions normally employed in the manufacture of commonly used vitrified grinding wheels. Such blanks vary in moulded form, from that shown in FIG. 1 and indicated by numeral 10, to include the matching of the companion stator counter-part component (not shown) of the usually paired rotor-stator combination, which combination may also vary in moulded blank form depending on intended application.

I sculpturally reshape, contour, groove and otherwise configure blank 10 into one of various formations preparatory to returning same to the source of origin to be kiln-fired along with other articles of the usual factory run of vitrified grinding wheels.

Reference is first made to the sequential steps in the development of such element members of matched rotor-stator combinations or assemblies as developed from the moulded unfired green blanks 10.

The moulded blank is preferentially composed of the desired predominant granule or grit sizes, within the size range of 16 to 60 mesh, suitable for kiln-firing to a "Q" grade body hardness, and of such dimensions as to allow for subsequent sculpturing. Except for isolated instances, blanks composed of predominant granule sizes ranging within such range of mesh size are generally adequate for the sculpturing contemplated to form fiber processing components suitable for most anticipated fibrous material processing requirements.

Blanks, composed of predominantly No. 46 mesh granules, are fine enough as to allow sculpturing configurations of sufficiently sharp delineation necessary for the kind of refining envisioned yet coarse enough as to accentuate and amplify the induced ingress fluid flows created by a rotating component under normal operation and as to accelerate the fiber abrading and/or scoring action of the sculptured surfaces.

Alumina oxide granules are preferred, being available in many types and tempers and varying in character according to treatment, and being fusible without bonding additives at kiln temperatures above those required in normal grinding wheel manufacture.

Blanks 10 in the green unfired state are subjected to the usual oven drying for the normal time period required for general grinding wheel making. However the larger sizes may require additional oven drying time, over and beyond that required for most vitrified grinding wheels, in order to avoid damage to surface configrations during the exrta handling encountered in the sculpturing operation of developing the contouring, grooving and maximized surface effects. Additional time in the order of 24 to 56 hours at 250° F. generally will be adequate although such dry time has not been consistently necessary except in the large sizes.

To allow handibility in the green condition, a temporary bond constituted by at least 85% of dextrin and 2.75% of water by weight of the total mix, or equivalent, may be used.

Different manufacturers of grinding wheels may be expected to vary the blank preparation and moulding program in accordance with the type of facilities available.

For instance, most blanks are now pressure moulded for reasons of economy. Component blanks which have been puddle moulded, as in the case of some larger sizes, have been found to be as satisfactory as the pressure moulded types.

Further, kilning procedures may vary according to desired blank dimensions, predominant size and type of granules, and vitrified body structure grade hardness.

In producing the moulded green unfired blank, suitable for further development according to the teachings of the invention, it is necessary only that the manufacturer know: (1) the desired dimensions of the moulded blank; (2) the predominant size and type of the granules; and (3) the desired grade hardness of the vitrified body structure after the firing.

The herein cited figures are subject to wide variations, due to the multiplicity of variables involved and will therefore require readjustment to variations with respect to type and size of granules, bonding to a particular grade hardness, type of apparatus employed in forming and kiln-firing of the blanks, and mode of operation, as may differ between manufacturers of grinding wheels for a given purpose for achieving equal or equivalent performance characteristics.

The second step comprises the rough reshaping and redimensioning of the so-procured blank to the desired overall outside approximate rough shape and profile dimensions according to the completed processing component which is envisioned and according also to the type of recesses comprehended for the various driving, mounting and reenforcing means which may be employed.

There the third step, there is laid out, on the working surfaces of the so-reshaped component, a predetermined type and system of orderly spaced or arranged fiber abrading and fiber flow influencing contours designed to obtain maximum fiber abrading or fiber separating action. This involves selecting a particular angularity of the contours as a means of inducing the desired fiber impact or fiber retention at the fiber processing surfaces of the cooperantly matched rotor and stator components as may be further enhanced by the induced ingress fluid flows by virtue of the sculptured contouring, the angularity thereof, the porosity of the component structure, and the centrifugal forces generated by the rotation of the rotating component member as to best accommodate a particular type of fiber treatment of processing within a particular phase of fibrous stock preparation. It also involves laying out, on the non-working surfaces, the outline for the necessary recesses for accommodating the desired mounting and driving and reinforcing means as may be required for the particular type of component.

A next step comprises the sculpturing or gouging out of the mounting and driving and reinforcing recesses followed by the sculpturing of the contours on the working surface areas, with the perimeter contours being sculptured after the flatside contours, all followed by the sculpturing in the areas between the contours of an incorporated selective system of fiber abrading grooving of an angularity to best enhance the objectives desired from the contouring, again with the perimeter grooving following the flatside grooving.

A next step comprises the truing of the opposed working surfaces of both the rotor and stator elements in order to provide matching, particularly with respect to operating clearances therebetween.

Figure 9:
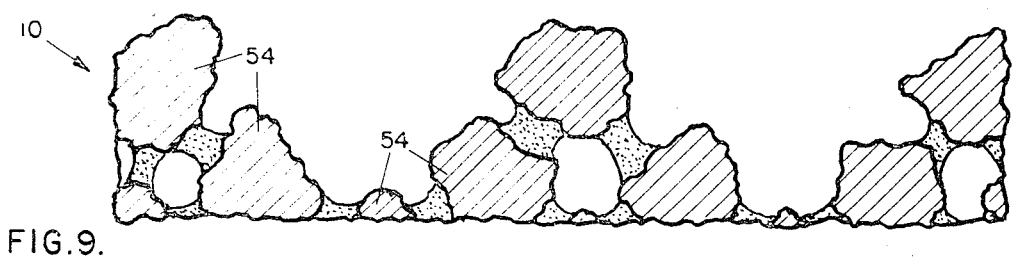
FIG. 9 is a view, similar to FIG. 8, but showing the surface character of a kiln-fired element with finish sculpturing.

The next step comprises continuing the sculpturing to a finish stage offering a maximized rough surface texture with the working surfaces being sculpturally dressed and combed to finished dimensions and surface texture by means of a saw-toothed tool to a texture and character of that shown in FIG. 9. The fineness or coarseness of the tool teeth employed will depend upon the predominant size of the granules constituting the blank.

The next step comprises air cleaning the sculptured working surfaces to remove all loosened granules and bonding dust, thus assuring a maximum surface porosity in the end product following kiln-firing.

The next step comprises air-spraying the sculptured working surfaces of the component lightly with a temporary type bonding material from liquid form with a mist from a paint type air spray applicator, just enough in quantity to cause the surface granules to become sufficiently tacky so that a light sprinkling of fine grit will adhere to the working surface sprayed portions. Such temporary bonding material may be of the same type used for the temporary bonding in the moulded blank, as already mentioned, or equivalent.

The applied fine grit is preferably of the same type and grade as the predominant granule used in the moulded blank. The size of the applied fine grit has been found to range preferably from 60 to 80 mesh size, depending on the size of the predominant granules. The coarser the granule size used in the blank, the coarser the applied grit.

The fine grit may be applied with a hand sieve or air type applicator suitable for obtaining a sparse adhering coating for obtaining an after-kiln-firing effect, as shown in FIG. 18.

The next step comprises returning the grit coated components to the supplier from whom the compact blanks were procured for packing the grit coated surfaces in non-fusing sand so as to hold the applied grit in place against the sculptured surface granules to assure against spauling or movement of the fine grit as to be firmly embedded within the vitrifying glaze that bands the body structure granules during kiln-firing along with other factory run Grinding type articles.

The kilning period and temperature will depend on the component size and type of kiln used.

Such moulded blanks may be composed of approximately 82% regular alumina oxide granules, 16% vitrifying band for a "Q" grade hardness, fired at roughly 2300° F.

Kilning temperatures ranging from 2200° F. to 2450° F. have been found to be adequate when the sizes of the predominant granules have ranged from 24 to 46 mesh and a hardness of "Q" grade has been desired.

Components approximating 12" in diameter or under and not exceeding 3" in thickness may be fired in most tunnel type kilns in from 2 to 3 days. Articles approximating 12 to 24" in diameter may be fired in most roll-in or wagon type kilns in from 5 to 7 days.

Larger articles may be fired in periodic (beehive) type kilns, requiring roughly about 3 weeks for loading, warming up, holding to kilning temperature, cooling down, and unloading.

Reference will now be made to the exemplifications in FIGS. 2–4 of a series of the rotating types of processing components made according to the above-delineated procedure.

Rotating components of the types shown and similar types not shown, operate cooperantly with suitable matched stators and may have all working surface areas of both components sculptured to a surface texture, as shown in FIG. 9. Such are particularly effective in processing fibrous materials to an individualized state, but the abrading action of such components on the fibers is generally of a transverse order, that is crosswise with respect to fiber length.

The operating elements, when used as a pair of opposed components, one as a rotor and one as a matched stator, provide means which are particularly suited to the processing of fibrous materials for paper making and allied purposes within any of the several phases of stock preparation, especially of the type involving the moisture-conditioning of dry bulk fibrous materials to a slurried condition of substantially individualized fibers and the refining of same to an accepted machine stock condition.

The resultant sculptured articles will vary as to shape, form and configuration, all according to the predetermined functions and processing requirements envisioned therefor. They may range from fiber moisture-conditioning and fiber separating rolls to varied types of fiber refining rotors and stators. In various of my copending applications, certain specific exemplifications of these articles are disclosed.

FIG. 2 shows, in side elevation, one type of a fibrous material processing rotor 12 as sculptured from a FIG. 1 type blank 10. One half of the exemplification is shown in section. The rotor will be understood to be unopposed at its top face with an opposing stator (not shown) being located with respect to its perimeter 16.

Rotor 12 illustrates a sculptured development for inducing slurried fiber flows of high velocities for maximum impact intended to operate in conjunction with a matched stator sculpturally configured so as to retard fiber flows initiated by the rotor to a minimum of velocity and thereby to achieve a maximum of impact. Such a combination of features is adapted for refining apparatus of the types such as shown in my copending application Ser. No. 315,589.

The rotor causes such fluid flows, within the porous structure and during normal operations, as greatly to increase the fiber-separating and fiber-abrading properties. That is, the rotor, by virtue of its porous structure, and because of centrifugal forces created by its own rotation, induces an extraction of the fluid from the slurried fiber stock at its leading contour facet surfaces so as to generate ingress fluid flows continuing as internal flows through the porous structure, same subsequently being expelled at the rotor perimeter in the form of egress fluid flows. The ingress fluid flows, at the point of maximum fiber impact, cause a suction action which greatly enhances the momentary arresting effects on those fibers making contact with the component surfaces, while the remaining fibrous mass is not, at that particular moment in time, so affected. Thereby, the contacted fibers are caused to be drawn out from the general fibrous mass as free, unattached, individualized fibers, free of any cutting action as with respect to fiber length, but more thoroughly abraded by virtue of the sculptured maximized surface texture and the porosity of the structure and the induced ingress fluid effects initiated by the revolving action of the rotor.

FIG. 3 is a small scale fragmentary view, in top plan, of another type of rotor 22, sculptured from a FIG. 1 type of blank 10; which rotor is adapted for use in an intermediate or blending phase of fibrous material processing between the preconditioning and refining phases. Such rotor is not suited for performing the function of the FIG. 2 rotor 12 in the respect that it requires an opposed stator disposed at its top radial face as well as at its perimeter. Conversely, the FIG. 2 rotor 12 will not perform the function of the FIG. 3 rotor 22.

The contours of the FIG. 3 rotor generate no high velocity flows at its perimeter, its grooving being intended to retard fiber flows in the direction of the perimeter so as to obtain prolonged retention and increased fiber abrading action as the rotor is rotated in a counter clockwise direction and when the opposing stator is also sculptured for a like action. The application of this type of rotor, when matched with its matched companion stator, is more particularly adapted to the blending phase and intermediate processing of moisture-conditioned slurried fibrous material, preceding the refining stage as I showed in apparatus in my copending application, Ser. No. 315,589.

Rotation of the FIG. 3 rotor, just as with the FIG. 2 rotor, causes fluid flows within the porous structure and the ridges between the grooved serrations thereof.

The FIG. 3 rotor develops equally essential fiber treating reactions which are suited for different types of fiber processing, such as rags and wood ships, by adapting the same basic principles of the invention to such types of fibers.

The FIG. 3 rotor does not produce high fiber impact and therefore is not intended to create high stock velocities at its perimeter and is unsuited for unopposing stator operation.

FIG. 4 is a small scale fragmentary view, in top plan, of another type of rotor 32 sculptured from a blank 10.

This rotor may be used for refining or intermediate processing, as exemplified in copending application Ser. No. 493,009. In such case, it is preferably rotated in a counter-clockwise direction for maximum fiber abrading effects, due to the angularity of the configuration tending to retard fiber flow. The rotor exemplifies a sculptural development adapted for operation under an induced feed so as to broaden its utility application as will be referred to in connection with the apparatus of FIG. 15. By virtue of the induced feed, the rotor will perform as an intermediate processing component and/or refining component within apparatus in an integrated processing system such as exemplified in said copending application.

The FIG. 4 type of rotor functions, not by impact or high velocity as in the case of the FIG. 2 rotor, but by opposed retarding flow in that it retards flow toward the perimeter, rotating counterclockwise, which all the grooves will have to oppose that flow due to the angularity of the grooving.

FIG. 5 is a fragmentary view, in top plan, of a rotor 42 embodying a modified form of surface configuration from that shown in FIG. 4, with fiber-conveying channels serving to obtain a scoring action lengthwise of the fiber structure.

This rotor, cooperatively with a matched stator, serves as a more effective means for subjecting fibers to a more severe scoring action and in a longitudinal manner, that is, lengthwise with respect to fiber length, all so as to allow obtaining more rapidly a more complete cellulose-water reaction to a desired state of fiber hydration or accepted stock condition in a shortened processing time.

In this case, the blank is sculpturally configured according to a predetermined system of fiber conveying channels only, they being generally semi-circular cross-section at the working surface areas, and without the removal of the mould-aligned granules 50, as will be referred to connection with FIG. 6, from the remaining areas 44 in between and around main feeder channels 46 and lateral channels 48, preparatory to kiln-firing.

The system of fiber conveying channels is shown to consist of 12 main feeder channels 46 which will convey fibers to the connected lateral channels 48 during a clockwise rotation of the rotor.

Figure 10:
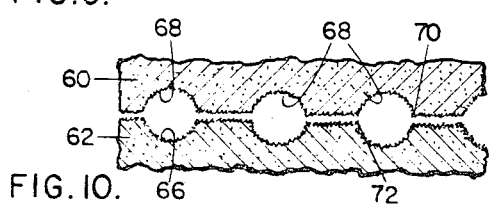
FIG. 10 is a small scale fragmentary view, in cross-section, of opposed stationary and rotary components, each sculptured so as alternately to define, upon rotor rotation, fiber conveying ducts.

The opposing stator (not shown) is similarly sculpturally configured with a like system of fiber conveying channels, so as, in alternating manner therewith, to momentarily register and non register with the channels of the channel system sculptured in the face of the opposing rotor in its entirety at a given instant of registering, thereby creating fiber conveying ducts throughout the whole system, as best shown in FIG. 10.

The cross-sectional dimensions of main feeder channels 46 will depend on the number of lateral channels 48 to be fed from each main feeder channel and the number of lateral channels will vary with the rotor diameter. For illustrative purposes, there may be four lateral channels 48 for each main feeder channel 46.

Both main feeder channels 46 and lateral channels 48 terminate short of the rotor perimeter to maintain a minimum of free escapement of non-scored fibers at these points.

FIG. 6 is a greatly enlarged fragmentary view in cross section showing, in a generally schematic manner, the granule arrangement at the surface of a FIG. 1 type blank 10 as same is removed from a mould.

Figure 7:
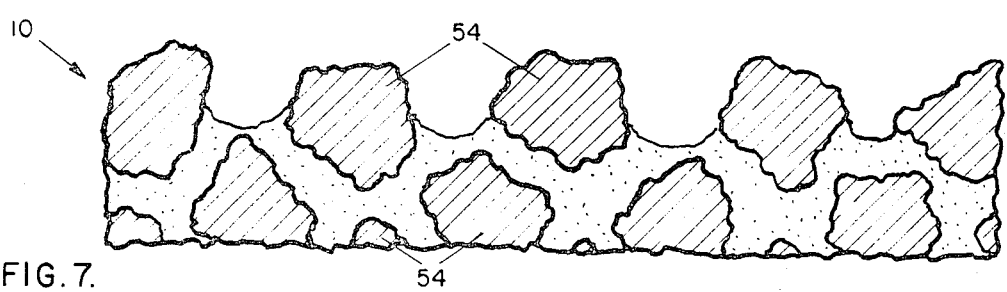
FIG. 7 is a view, similar to FIG. 6, showing the surface character of the blank following rough reshaping and preceding final sculpturing.
Figure 8:
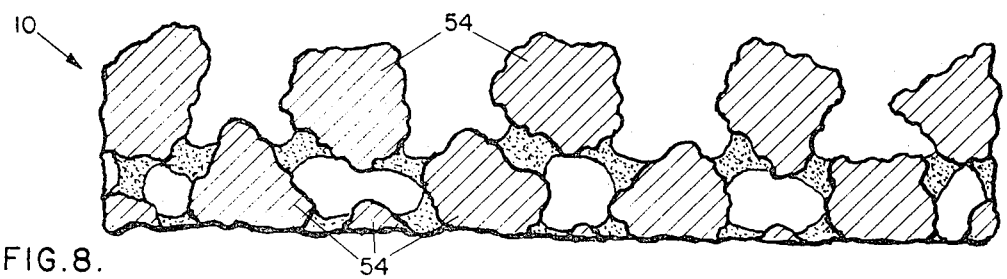
FIG. 8 is a view, similar to FIG. 7, showing the surface character in the case of an element kiln-fired without finish sculpturing.

At the stage of development, identified above as the fifth step and comprising a truing of the opposed working surfaces, in the cases of rotors 12, 22 and 32 and of their respective companion stators, all of the mould-aligned surface granules, delineated 50 in FIG. 6 are removed from the working surface areas and main body granules 54 so as to provide surface textures of the character shown in FIG. 7 which, on kiln-firing of the component in this incomplete condition, would cause the preliminary sculptured surfaces to appear as shown in FIG. 8.

That is, in the FIG. 6 showing, the granule arrangement at the surface of the unfired green blank 10 is shown as same is removed from a mould. The granule arrangement normally existing at the surface portion is dramatized. The aligning effects experienced by virtue of the fact that certain granules 50 will have had contact with adjacent mould surfaces during the moulding program is obvious and therebecause such granules are identified as mould-surface-aligned granules. These granules are desirably removed for the reason that they are so closely and densely packed as to define these relatively flat surfaces offering low fiber abrading effects, tending to retard fluid flow ingress to and egress from an otherwise more porous blank interior, and generally lacking the maximized rough surface texture required in such components for general fiber conditioning.

FIG. 7 dramatizes the surface character of a blank 10 following the rough reshaping and preceding the final sculpturing as referred to in the steps of the method, while the FIG. 8, for the sake of comparison, shows the porous surface and structural characteristics should an element be kiln-fired without the finish sculpturing.

FIG. 9 is a view, similar to FIG. 8 showing surface character of a kiln-fired element sculpturally finished to allow the maximized surface characteristic.

In the small scale fragmentary view delineated FIG. 10, I have shown opposed components, one stationary member 60 and one rotary member 62, each sculptured to momentarily define, upon rotor rotation, alternate fiber conveying ducts 68 formed by sculpturally matched channels 64 and 66 of members 60 and 62 respectively, such channels being of the type illustrated in FIG. 5 and in FIG. 14 to be referred to.

Figure 11:
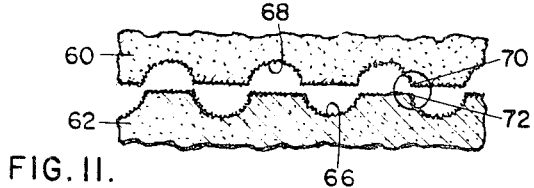
FIG. 11 is a view, similar to FIG. 10, showing the opposed components, with the leading edges of the ducts shown at an alternating momentary maximum fiber-score-drawing position, subsequent to the FIG. 10 position, by virtue of the rotor rotation.

FIG. 11 is a view, similar to FIG. 10m, showing the same opposed components 60 and 62 with the leading edges 70 and 72 respectively of the channels 64 and 66 shown at an alternating momentary maximum fiber-score-drawing position, subsequent to the FIG. 10 position, by virtue of the rotation of the rotor component 62.

Figure 12:
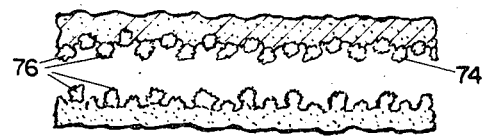
FIG. 12 is a view, in top plan, of somewhat enlarged fragmentary portions of the opposed components of FIGS. 10 and 11 and showing the jagged character of the fiber-score-drawing ridges formed by the opposed channel leading edges while approaching the alternating momentary position "A" of FIG. 11 during rotor rotation.

FIG. 12 is a view showing fragmentary portions of the opposed rotor and stator 60 and 62 and dramatizing the jagged character of the fiber-score-drawing ridges formed by the opposed channel leading edges 70 and 72 while approaching the alternating momentary position of FIG. 11 during rotor rotation.

FIG. 13 is a fragmentary cross section view of FIG. 12, at a momentary laternating opposed position of the leading fiber-score-drawing duct ridges at position "A" of FIG. 11, more clearly showing the porous character of the components at points of concentrated pressurized ingress fluid flows from the fiber slurry as caused by the rotor action during normal operation.

FIG. 14 is a fragmentary view of a modified form of rotor 42 of FIG. 5 showing a volute type of sculptured channelling and a portion of the stator opposing the perimeter of a companion rotor and also showing additional auxiliary sculptured fiber conveying ducts alternatingly momentarily formed at the rotor perimeter surface area.

FIG. 15 is a fragmentary view in cross section of one type of apparatus to which components of the type shown in FIGS. 5 and 10 to 14 and matched companion stators may be adapted.

FIG. 16 shows, in the case of opposed sculptured channel leading edges, how many may be given a saw-tooth formation for providing a more extended fiber score-drawing linage and flow ingress flow surface area with respect to channel length which is particularly applicable to the channelling of FIGS. 5 and 14.

FIG. 17 shows the saw-tooth configuration sculpturally oriented on the leading edges of the channels as to provide higher concentrated pressures on the fibers by virtue of increased ingress fluid flows extracted from the fiber slurry adjacent the fiber score-drawing ridges, while maintaining the same rotor-stator clearance relationship and rotative speed.

FIG. 18 shows the surface character of component working surfaces that have been sparsely coated with fine grit preparatory to the fusing thereof to the surface granules during the normal kiln-firing of the components so treated.

By sculpturing the fiber conveying channels in the working surface areas of the blanks so as to preserve the mould-aligned granule effects in areas 44 in between the sculptured channels preparatory to kiln-firing, abrutply formed and sharply delineated fiber score-drawing ridges 70 of a prominent jagged nature are obtained. These are shown fragmentarily in plan, partly in phantom, in FIG. 12 and in cross-section fragmentarily, still further enlarged, in FIG. 13.

By virtue of the fiber conveying ducts formed by main feeder channels 46 and lateral channels 48 of opposed components 40 and 42, as shown in FIG. 10, the fiber flow impelling centrifugal forces, created by the rotation of rotor 42 in combination with the flow inducing action of a sculptured feed screw type rotor 70 and companion stator 72, during normal operation in apparatus of the type shown in FIG. 15, a charge of slurried fibers is caused to fill the ducts so formed.

Likewise, by virtue of the rotation of the rotor, the charges of fibers are caused subsequently to be forcibly drawn over and in between granules 74 forming leading ridges 76 of channels 46 and 48 of both components 40 and 42, during that part of the off-register relationship of said channels, as shown in FIG. 11, while additionally being simultaneously subjected to the drag effects resulting from the increased concentrated ingress flows of slurry fluid caused to flow through the porous portions of the component structure, at those leading portions of the channels via voids 80 and 82 of components 40 and 42 respectively, at the proximity of the fiber drawing action as greatly to intensify the fiber scoring action, by virtue of voids in between the granules as better shown in FIG. 13.

The high compression effects on the charge of slurried fibers during the momentary off-registering of the component channels such as at phase position "A" of FIG. 11, shown fragmentarly in FIG. 13, causes concentrated ingress flows that greatly amplifies the intensity of the drag that results in an increased severity of the fiber scoring action that accelerates the hygroscopic changes in the fibers within a shortened period of processing time.

The sculptural differences between the FIGS. 5 and 14 types is in the arrangement of the sculptured fiber conveying channels, those of FIG. 14 being of a volute order to permit increased column flows and less fiber retention so as to be more suited to processing the less tough fibrous materials.

The perimeters of the rotors of FIGS. 5 and 14 and the opposing stator portions may be sculpturally channeled parallel with the axis of the rotor or inclined forwardly, or backwardly with respect to rotation of the rotor, for more or less fiber retention effects.

The apparatus shown in fragmented cross section in FIG. 15 is one arrangement. Both variations of the rotor components 42 of FIGS. 5 and 14 and respective matched companion stator component sections 40 and 42 may be assembled for general refining purposes, when operated in conjunction with bulk material preconditionally slurrizing apparatus.

Rotor component section 70 and opposed matched stator component section 72 are both channel sculptured in a spiralling manner wherewith to feed stocks in a downward direction while simultaneously maintaining a desired degree of agitation in a vat 80 and may be employed with various types of components such as shown in FIGS. 5 and 14 and respective stator components, and/or variations thereof, generally as shown in FIG. 15.

The processing components of the type shown in FIG. 15, may be of relatively thin cross section or wafer type, which in the case of the stator components, may be of the dual purpose type, serving as rotor enclosure apparatus housing components, without the need for outside metallic supporting shell or jacket cover, or support backing when the outer surfaces are moisture-proofed with any suitable plastic, paint or other type of coating.

The versatility and adaptability of the sculptured ceramic porous components, with respect to method of application, is not limited to the thin wafer type or the adjustable clearance gap arrangements of FIG. 15.

The sculptured components may be of the tapered perimeter rotor and tapered bore stator type, having adjustable clearance and the tapered working areas, or of the free floating rotor types, having working surfaces on the underside of the rotor as well as the top side of same and on the top side of same and on the top side of the bottom stator component section with self adjustable clearances between the bottom side of the rotor and top side of bottom stator component or other opposed surface flow arrangements not shown.

Rotor 42, while shown as a monolithic part, may be composed of two matched sculptured component parts, each suitably recessed at the inner faces as to accommodate a common driving flange or disc, reenforcing and bonding means for shaft mounting and operational adjustment of either of the dual sculptured faces so formed (not shown).

So far, in my experimental development of sculptured fiber processing ceramic types of components, have I found any variations in the molding of the vitrifiable grinding wheel blanks that I have used; the moulding pressures employed therefor; the vitrifying bonding ingredient compositions thereof; the type of granules used; the type of kiln employed; the firing duration and temperatures maintained at the various sources from which such blanks have been procured by selection or on specification for my sculpturally configuration purposes, to show any noticeable differences in fibrous material processing performance results, as to warrant any particular preference in such variations, other than a choice for a grade hardness and predominant granule size, the latter to better meet a particular fiber processing phase requirement.

For intermediate processing of the moisturized fibrous materials to a uniformly blended slurry of substantially individualized fibers, suitable for refiner feeding, I have found vitrifiable grinding wheel blanks predominantly composed of No. 36 granules to be satisfactory when sculptured for this phase of fiber processing.

In viewing the sculptured portions of the granular components under a microscope, the porous structure will be observed to be far more open and the voids 80 and 82 of FIG. 13 to be far more spacious than represented in FIG. 13, for the reason an actual 3-dimensional view cannot be illustrated in true perspective or arrangement in a two dimensional schematic drawing of this type with sufficient clarity.

From such microscopic observation, it will be better understood why sculpturally configuring granular blanks of almost any vitrifiable type, such as are employed for ceramic grinding wheel manufacture, transforms such blanks into unique articles, suitable for use in an entirely different field, such as fibrous material processing, by virtue of the porosity characteristics that accentuates the irregularity of the constituent inner granules, exposed by the sculpturing, in addition to contributing to the fiber scorability by such exposed inner granules by virtue of the intensified attenuating effects such porosity promotes, while simultaneously allowing increased ingress fluid flows induced by the rotating component during normal operation, that additionally improves and accelerates the fiber treating action and capacity of the sculptured type of components.

The greatest benefit derived from the use of sculptured components in the stock preparation phases of fibrous material processing, can probably be anticipated to be in the more rapid drying characteristics of the webs formed from stocks so processed, for the reason a high state of fiber "hydration" so called, is obtained without exposure of the fiber inner cavity or lumen, to the entry of excess free non-essential moisture.

Because the lumen or inner cavity may comprise the larger portion of a fiber structure as a void, the exposure of such void as occurs during processing by pulpers, beaters, Jordans, and refiners, employing the bar against bar principle, that cut, crush, bruise or sever the fibers into divided sub-particles, allows the entry of non-absorptive and non-essential moisture into said voids, that may well exceed the actual volume or weight of the fiber structure thereof.

Since such moisture that becomes so captivated is not removable at the presses, it tends to retard the web drying as to cause a decreased capacity of the paper making machine.

"Contours," as the term is herein applied, are intended to define those uniformly systemized, sculptured multiplicities of depressions or configurations, characterized by non-uniform depths with respect to non-parallel widths and sides, as to form intermediate crests or ridges such as delineated 64 in FIG. 2 and 68 in FIG. 3 or otherwise (not shown), thereby to influence and direct slurried fiber flows and counter flow effects between the rotating and stationary components as to increase or decrease the fiber retention at and in between the fiber abrading surfaces as to cause increased fiber impact high slurry pressures and ingress fluid flows at the leading portions of said configurations.

Fiber abrading "grooves," as the term is applied herein, are intended to pertain to define those intermediate smaller shallow, less prominent, more closely arranged, sculptured serratures of more uniform depth and width, usually sculptured in parallel multiple formation as delineated 60 in FIG. 3, interposedly incorporated between contours, thereby to enhance the fiber abrading effects of the working surfaces which have been sculpturally tooled to a maximized roughened character such as shown in FIG. 9, that further promotes increased ingress fluid flows into the porous component structure part of the ridges so formed.

Fiber conveying "channels" identifying those fiber conveying sculptured depressions of generally uniform depth and width, which are more prominent than the grooves, but are generally less prominent than contours, and serve the purpose, which neither the grooves or contours are suited to perform), of conveying fiber flows along and throughout the length of the depression for distribution along the fiber scoring ridges whereby the fibers are subjected more extensively to the ingress fluid flows adjacent the fiber scoring ridges.

Fiber "abrading" identifies that action imposed on slurried fibers when caused to flow over unopposed or between opposed porous granular components having surfaces of the type shown in FIG. 9 particularly when operating with sufficient clearances as to permit ready reorientation of the fiber constituents, thereby to promote the erosion of the fiber outer wall by a multitude of abrasions in the form of nicks caused by the protruding granules resulting from sculpturing, said nicks being generally of a transverse order with respect to the fiber length.

"Fiber scoring" is the term used herein for identifying that action resulting when fibers are more forcibly drawn through an environment so as to be less free for reorientation or readjustment and thus consequently to have the outer wall more severely or deeply gouged or scored, generally in a lengthwise manner by virtue of the environment.

The sculpturing procedure steps in developing the fiber treating components of the type shown in FIGS. 5 and 14, that are to be utilized as shown in FIG. 15, is modified somewhat from that in developing components of the FIGS. 2 to 4 types in that the flat mould-aligned-granular surfaces effects of the intended opposed working portions of both rotor and stators thereof, are preserved as moulded, into which the fiber conveying channels only are sculptured into said surfaces as shown in FIGS. 5 and 14.

Obviously, unless special moulds are provided, to obtain a particularly desired clearance gap at the rotor perimeter, it is generally necessary to either machine shave the rotor perimeter or the stator bore to accommodate one to the moulded dimension of the other preparatory to the surface configuration thereof.

I claim:
1. A method of making a vetrified granular abrasive element comprising the steps of:

rough sculpturing the working surfaces of a green unfired alumina granular molded and oven dried grinding wheel blank containing predominant granules of aluminum oxide within the size range of 16–60 mesh and suitable for kiln-firing to a Q grade body hardness with flow-influencing grooves and contours, providing the grinding wheel blank with mounting reinforcing recesses, truing the working surfaces of the grinding wheel blank for eventual matching with a companion granular element, finish sculpturing the working surfaces of the grinding wheel blank, air-cleaning the working surfaces of the grinding wheel blank for the removal of loose granules and bonding dust, providing the working surfaces of the grinding wheel blank with a tacky condition by the application of a coating of a temporary bonding material in the form of dextrin, coating the working surfaces with alumina grit within the size range of 60–80 mesh, and vitrifying the grinding wheel blank by kiln-firing within the temperature range of 2200° F. and 2450° F. and fusing the grit to the exposed surfaces of the granules of the working surfaces.

References Cited

UNITED STATES PATENTS

| | | | |
|---|---|---|---|
| 945,931 | 1/1910 | Gardner | 51—293 |
| 2,730,439 | 1/1956 | Houchins | 51—307 |
| 2,731,336 | 1/1956 | Wallace et al. | 51—309 |
| 2,904,418 | 9/1959 | Fahnoe | 51—309 |
| 3,248,189 | 4/1966 | Harris | 51—309 |
| 3,295,941 | 1/1967 | Spellman | 51—309 |

DONALD J. ARNOLD, Primary Examiner

U.S. Cl. X.R.

51—308, 309